United States Patent
Mond et al.

(10) Patent No.: US 9,140,199 B2
(45) Date of Patent: Sep. 22, 2015

(54) COMBUSTION MODE SWITCHING WITH A TURBOCHARGED/SUPERCHARGED ENGINE

(71) Applicant: Robert Bosch GmbH, Stuttgart (DE)

(72) Inventors: Alan Mond, Ann Arbor, MI (US); Li Jiang, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 413 days.

(21) Appl. No.: 13/679,010

(22) Filed: Nov. 16, 2012

(65) Prior Publication Data

US 2013/0125544 A1   May 23, 2013

Related U.S. Application Data

(60) Provisional application No. 61/560,919, filed on Nov. 17, 2011.

(51) Int. Cl.
*F02B 33/44* (2006.01)
*F02B 33/00* (2006.01)
(Continued)

(52) U.S. Cl.
CPC . *F02D 23/00* (2013.01); *F01L 1/34* (2013.01); *F02B 1/14* (2013.01); *F02B 37/04* (2013.01);
(Continued)

(58) Field of Classification Search
CPC ............... F02D 23/00; F02D 13/0207; F02D 2021/083; F02B 37/12; F02B 37/04; F02B 37/183; F02B 1/14; F01L 1/34; F02M 25/0707; Y02T 10/18; Y02T 10/144
USPC ............ 60/611, 612, 600, 605.1, 605.2, 609; 123/90.15, 295, 561–562, 564; 701/103–104
See application file for complete search history.

(56) References Cited

U.S. PATENT DOCUMENTS 3,595,013 A * 7/1971 Brille et al. ............... 60/609
4,730,457 A   3/1988 Yamada et al.
(Continued)

FOREIGN PATENT DOCUMENTS

DE   3205721 A1 * 8/1983 ............. F02B 37/14
DE   19905112   8/2000
(Continued)

OTHER PUBLICATIONS

United States Patent Office Action for U.S. Appl. No. 13/336,220 dated Jul. 18, 2013 (15 pages).
(Continued)

*Primary Examiner* — Thai Ba Trieu
(74) *Attorney, Agent, or Firm* — Michael Best & Friedrich LLP (57) ABSTRACT

A method for switching between low- and high-dilution combustion modes in an internal combustion engine having an intake passage with an exhaust-driven turbocharger, a crankshaft-driven positive displacement supercharger downstream of the turbocharger and having variable boost controllable with a supercharger bypass valve, and a throttle valve downstream of the supercharger. The current combustion mode and mass air flow are determined. A switch to the target combustion mode is commanded when an operating condition falls within a range of predetermined operating conditions. A target mass air flow to achieve a target air-fuel ratio corresponding to the current operating condition and the target combustion mode is determined. The degree of opening of the supercharger bypass valve and the throttle valve are controlled to achieve the target mass air flow. The amount of residual exhaust gas is manipulated.

19 Claims, 4 Drawing Sheets

(51) Int. Cl.
*F01L 1/34* (2006.01)
*F02D 23/00* (2006.01)
*F02B 37/12* (2006.01)
*F02B 37/04* (2006.01)
*F02B 37/18* (2006.01)
*F02D 13/02* (2006.01)
*F02B 1/14* (2006.01)
*F02D 21/08* (2006.01)

(52) U.S. Cl.
CPC .............. *F02B 37/12* (2013.01); *F02B 37/183* (2013.01); *F02D 13/0207* (2013.01); *F02D 2021/083* (2013.01); *Y02T 10/144* (2013.01); *Y02T 10/18* (2013.01)

(56) References Cited

U.S. PATENT DOCUMENTS

| | | | |
|---|---|---|---|
| 4,738,110 | A | 4/1988 | Tateno |
| 5,335,500 | A * | 8/1994 | Wunderlich et al. ............ 60/609 |
| 6,343,473 | B1 * | 2/2002 | Kanesaka ...................... 60/609 |
| 6,739,295 | B1 | 5/2004 | Yamaoka et al. |
| 7,089,913 | B2 | 8/2006 | Yamaoka et al. |
| 7,370,616 | B2 | 5/2008 | Kuo et al. |
| 7,438,045 | B2 | 10/2008 | Herweg et al. |
| 7,484,368 | B2 | 2/2009 | Jorgensen |
| 7,540,270 | B2 | 6/2009 | Kang et al. |
| 7,552,588 | B2 * | 6/2009 | Magner et al. .................. 60/600 |
| 7,565,892 | B1 | 7/2009 | Cleary et al. |
| 7,689,344 | B2 | 3/2010 | Kang et al. |
| 7,810,329 | B2 | 10/2010 | Noodt et al. |
| 2003/0131805 | A1 | 7/2003 | Yang |
| 2003/0226528 | A1 | 12/2003 | Yamaoka et al. |
| 2005/0090966 | A1 | 4/2005 | Strom et al. |
| 2006/0157036 | A1 | 7/2006 | Andersen |
| 2007/0137199 | A1 * | 6/2007 | Magner et al. ............... 60/605.1 |
| 2008/0011278 | A1 * | 1/2008 | Yamagata ...................... 60/609 |
| 2010/0012083 | A1 | 1/2010 | Tanaka et al. |
| 2011/0067679 | A1 | 3/2011 | Hitomi et al. |
| 2011/0168130 | A1 | 7/2011 | Kang et al. |
| 2012/0090319 | A1 | 4/2012 | Mond et al. |

FOREIGN PATENT DOCUMENTS

| | | |
|---|---|---|
| GB | 2420152 | 5/2006 |
| JP | 02119621 | 5/1990 |
| JP | 2010144558 | 7/2010 |

OTHER PUBLICATIONS

Johansson et al., "HCCI Operating Range in a Turbo-charged Multi Cylinder Engine with VVT and Spray-Guided DI," SAE International, 2009, 12 pages.

Kulzer et al., "A Thermodynamic Study on Turbocharged HCCI: Motivation, Analysis and Potential," SAE Int. J. Engines, Apr. 12, 2010, pp. 733-749, vol. 3, No. 1.

Mamalis et al., "Comparison of Different Boosting Strategies for Homogeneous Charging Compression Ignition Engine—A Modeling Study," SAE Int. J. Engines, Apr. 12, 2010, pp. 296-308, vol. 3, No. 1.

Shingne et al., "Turbocharger Matching for a 4-Cylinder Gasoline HCCI Engine Using a 1D Engine Simulation," SAE, Oct. 25, 2010, 14 pages.

Gharahbaghi et al., "Modelling an Experimental Investigations of Supercharged HCCI Engines," SAE International, Apr. 3-6, 2006, 12 pages.

Shingne et al., "Application of a Supercharger in a Two-Stage Boosting System for a Gasoline HCCI Engine: A Simulation Study," ASME, Oct. 2-5, 2011, pp. 1-10.

"Inside VW's New Twincharger TSI Engine," Green Car Congress, Aug. 31, 2005, Retrieved from Internet on Jan. 30, 2012 <URL: http://www.greencarcongress.com/2005/08/inside_vws_new_ html>.

* cited by examiner

COMBUSTION MODE SWITCHING WITH A TURBOCHARGED/SUPERCHARGED ENGINE

CROSS-REFERENCE TO RELATED APPLICATIONS

This applications claims priority to U.S. Provisional Patent Application No. 61/560,919, filed Nov. 17, 2011, the entire contents of which are hereby incorporated by reference.

STATEMENT REGARDING FEDERALLY SPONSORED RESEARCH AND DEVELOPMENT

This invention was made with Government support under contract DE-EE0003533 awarded by the Department of Energy. The Government has certain rights in this invention.

BACKGROUND

The present invention relates to internal combustion engines operable in multiple combustion modes, including a spark-ignition (SI) mode and a low-temperature lean auto-ignition (e.g., homogeneous charge compression ignition—HCCI) mode. Engines operable in multiple modes are known to those of ordinary skill in the art with the benefit that the engine can be operated in SI mode during times of high load and/or high engine speed, and when cruising at low load and low engine speed substantial fuel efficiency gains can be realized by operated in HCCI mode. However, transitioning between the different combustion modes with acceptable predictability and precision in real-world driving conditions remains to be a barrier to widespread use of this technology.

SUMMARY

In one aspect, the invention provides a method for switching from a current combustion mode, which is either of a low-dilution combustion mode and a high-dilution combustion mode, to a target combustion mode, which is the other of the low-dilution and high-dilution combustion modes in an internal combustion engine having an intake passage with an exhaust-driven turbocharger, a crankshaft-driven positive displacement supercharger downstream of the turbocharger and having variable boost output controllable with a supercharger bypass valve, and a throttle valve downstream of the supercharger. The current combustion mode is determined. The current mass air flow is determined. A combustion mode switch to the target combustion mode is commanded when a current operating condition falls within a range of predetermined operating conditions. A target mass air flow amount to achieve a target air-fuel ratio corresponding to the current operating condition and the target combustion mode is determined. The degree of opening of both the supercharger bypass valve and the throttle valve are controlled to achieve the target mass air flow. The amount of residual exhaust gas is manipulated.

In another aspect, the invention provides a method for switching from a low-dilution combustion mode to a high-dilution combustion mode, in an internal combustion engine having an intake passage with an exhaust-driven turbocharger, a crankshaft-driven positive displacement supercharger downstream of the turbocharger and having variable boost output controllable with a supercharger bypass valve, and a throttle valve downstream of the supercharger. A high lift intake valve setting is switched to a low lift intake valve setting. A target mass air flow amount to achieve a target air-fuel ratio for high-dilution combustion under a current operating condition is determined. The degree of opening of both the supercharger bypass valve and the throttle valve are controlled to achieve the target mass air flow after switching to the low lift intake valve setting to achieve a transitional combustion mode. The engine is operated in the transitional combustion mode while adjusting the phasing of exhaust valve actuation to increase residual exhaust gas. A high lift exhaust valve setting is switched to a low lift exhaust valve setting after the phasing of the exhaust valve actuation is adjusted. Auto-ignition is commenced within a predetermined number of engine cycles after switching to the low lift exhaust valve setting.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
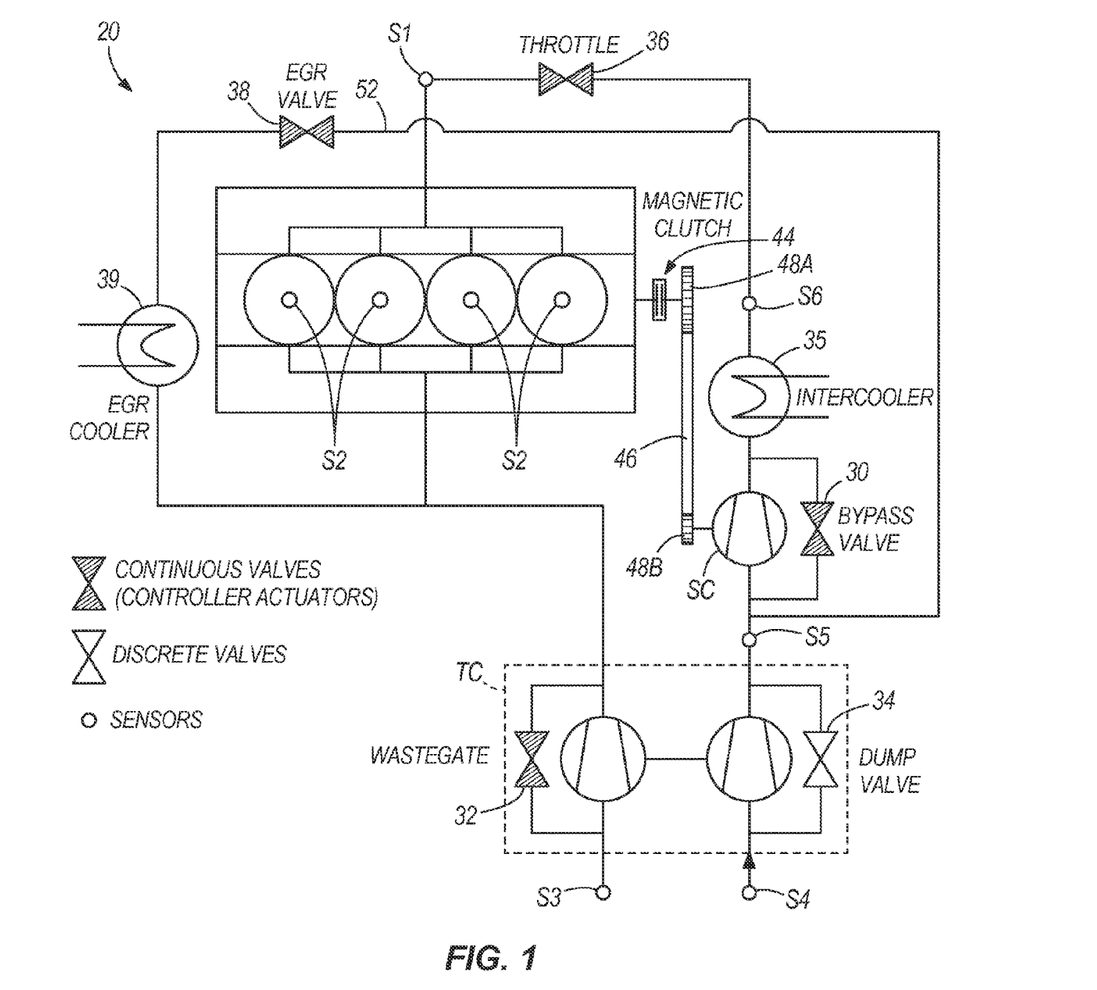
FIG. 1 is a schematic diagram of an internal combustion engine having a turbocharger in series with a supercharger.

An internal combustion engine 20 is schematically illustrated in FIG. 1. The engine 20 is illustrated as a four-cylinder engine, but other configurations are optional. The engine 20 includes a crankshaft coupled to a plurality of pistons, each of which reciprocates in a cylinder and cooperates with a cylinder head to define a corresponding combustion chamber. The cylinder head is provided with at least one sparking device, at least one intake valve, and at least one exhaust valve in communication with each combustion chamber. The intake and exhaust valves control the flow of intake air and exhaust gases into and out of the combustion chamber. As known to those of skill in the art, the intake and exhaust valves can be camshaft-driven (FIG. 3 refers, by way of example, to the switching of intake and exhaust cams) or driven by other types of actuators. The intake and exhaust valves may be configured to have predetermined high-lift states and predetermined low-lift states, or alternatively, may be variable to more than two different lift states in either a series of discrete steps or a smooth, "stepless" manner. Regardless of the type of device actuating the intake and exhaust valves, the intake and/or exhaust valves of the engine can be provided with variable lift and/or variable phasing (with respect to the piston stroke or crankshaft angle). In some constructions, the intake and exhaust valves are part of a fully-flexible valvetrain, in which both the intake and exhaust valves are adjustable for lift amount and phasing in response to an engine control module. Because the basic components of internal combustion engines are well-known, and the particular structures of such components are not germane to the invention, the components are not illustrated in the drawings or discussed in further detail.

The air intake passage of the engine 20 includes multiple boosting devices and actuators. In particular, the engine 20 includes an exhaust gas-driven turbocharger TC and a crankshaft-driven positive-displacement supercharger SC downstream of the turbocharger TC. In addition, several controllable actuators are provided in the air intake passage. These actuators include a supercharger bypass valve 30, a turbocharger wastegate 32 (on the exhaust side of the turbocharger TC), a turbocharger bypass valve 34 or "dump valve" (on the intake side of the turbocharger TC), an intercooler 35 to cool the compressed and heated intake charge, and a throttle valve 36 adjacent the engine's intake manifold. The intercooler 35 can be positioned downstream of the supercharger SC as shown, or alternately downstream of the turbocharger TC and upstream of the supercharger SC. The turbocharger wastegate 32 controls the generation of boost pressure, and the turbocharger bypass valve 34 controls the delivery of compressed intake air, as known to those of skill in the art.

An exhaust gas recirculation (EGR) passage 52 establishes communication between an exhaust passage upstream of the turbocharger TC and a portion of the intake passage (e.g., upstream of the supercharger SC) and is controlled via an EGR valve 38. Alternately, the EGR passage can extend from a downstream side of the turbocharger's exhaust side to the inlet of the supercharger. An EGR cooler 39 can be provided along the EGR passage to cool the exhaust gas before it joins the intake passage. The supercharger SC is coupled to the crankshaft through a clutch 44 so that the drive connection between the crankshaft and the supercharger SC can be controlled by the engine control module. The clutch 44 can be a magnetic clutch (e.g., an electronically-controlled electromagnetic clutch), or any other desired type of clutch. A mechanical connection is established between the clutch 44 and the supercharger SC by a belt 46 and two pulleys 48A, 48B, but other mechanical connections, such as sprockets and chains, or gears, may be used.

Figure 4:
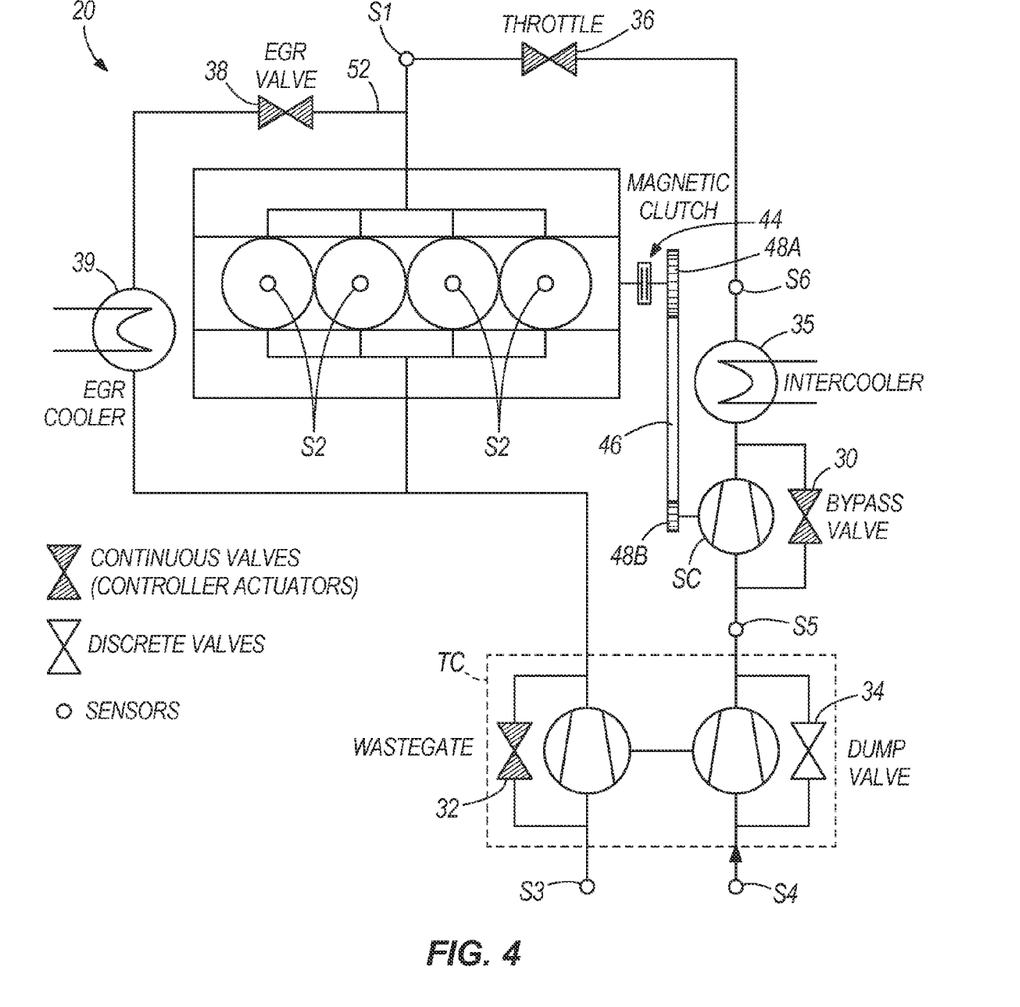
FIG. 4 is a schematic diagram of an internal combustion engine, similar to that of FIG. 1 with an alternate exhaust gas recirculation arrangement.

FIG. 4 illustrates the engine 20 configured with a different EGR arrangement. As shown in FIG. 4, the engine 20 can include an EGR passage 52 fluidly connecting the exhaust gas upstream of the turbocharger's exhaust side to the intake tract downstream of the throttle valve 36. The flow of recirculated exhaust gas is controlled by a valve 38. As described in further detail below, the recirculated exhaust gas, regardless of the plumbing configuration, can be used to dilute the combustion by increasing the excess air factor ($\lambda$).

Although not the direct subject of the present application, it should be noted that the construction of the engine 20 is unique in that the positive-displacement supercharger SC is provided downstream of the turbocharger TC in the intake path. As described in further detail below, the supercharger SC is utilized to enhance the efficiency of the engine 20 by enabling charge dilution to significantly increase the excess air factor ($\lambda$) for operating in a highly diluted combustion mode when conditions allow. Thus, the supercharger SC is configured to operate in low load and low engine speed conditions to dramatically improve efficiency. This is generally counter-intuitive as positive-displacement superchargers are typically used to increase peak power production and are considered inherently less efficient than turbochargers (due to crankshaft losses necessary to drive a supercharger). In fact, the supercharger SC of the engine 20 is configured to be mechanically decoupled from the crankshaft via the clutch 44 at high engine speeds where the engine 20 is in a conventional spark ignition combustion mode.

Figure 2:
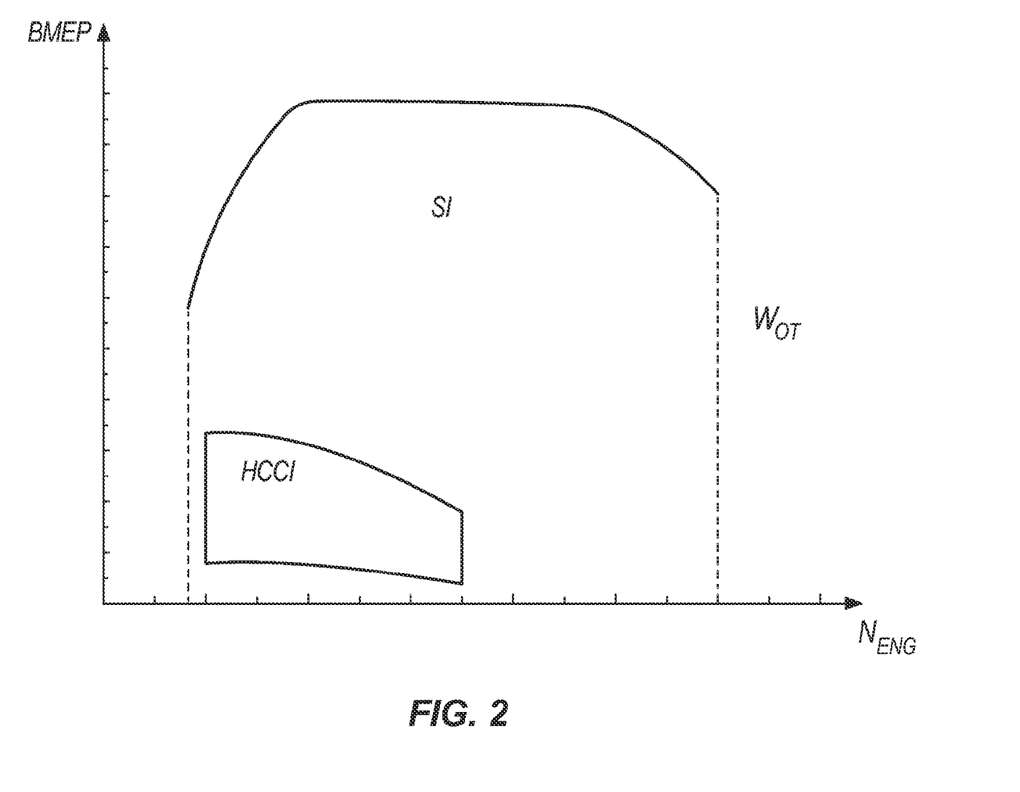
FIG. 2 is a plot mapping multiple combustion modes over the operating range of the internal combustion engine in brake mean effective pressure (BMEP) in bar vs. engine speed in revolutions per minute (RPM).

With this unique architecture, control challenges arise, such as coordinating the operation of the supercharger bypass valve 30, the turbocharger wastegate 32, the throttle valve 36, and the operation of the intake and exhaust valves to enable multiple combustions modes and the switches between combustion modes. FIG. 2 illustrates a load-speed graph of a particular configuration in which the engine 20 is configured to operate in two different combustion modes (i.e., homogeneous charge compression ignition or "HCCI" and spark ignition or "SI"). The SI combustion mode can be a conventional stoichiometric spark ignition combustion mode in an exemplary construction. The HCCI mode can be a low-temperature lean auto-ignition mode in which a spark is not utilized at all for combustion, or alternately a combustion mode such as spark-assisted compression ignition (SACI) in which an initial spark is provided to begin a combustion event, but the initial flame, along with the compression from the piston, causes a pressure increase that causes the combustion event to continue to completion by auto-ignition. SACI combustion has a very large operating range and may utilize between about 8 percent and about 15 percent exhaust gas recirculation (EGR). Furthermore, the engine 20 may be configured to perform other types of high-dilution combustion besides HCCI, such as highly-diluted spark ignition (SI). It should also be noted that HCCI combustion can be carried out with boost or without boost (i.e., naturally aspirated). Although specific examples are provided, switching may be provided between other combustion modes and/or more than two combustion modes. Additional combustion modes can be implemented either as transition modes between the above-described modes, or as alternate target modes. Examples of optional combustion modes include lean SI and stoichiometric HCCI. As used herein, a "lean" or "high-dilution" combustion mode generally refers to combustion with an operating range of excess air factor $\lambda$ between about 1.02 and about 1.8, and a "stoichiometric" or "low-dilution" combustion mode generally refers to an operating range of excess air factor $\lambda$ between about 0.98 and about 1.05. Unless specifically referred to as "stoichiometric HCCI", HCCI refers to a lean HCCI combustion mode.

One unique aspect of the control of the engine 20 is the charge dilution control under low-temperature lean auto-ignition combustion such as HCCI combustion, involving the coordination of the supercharger bypass valve 30, and the intake valve actuation phasing to achieve the desired amount of air charge. In line with the exemplary construction of FIG. 2, and for the purposes of simplification, the immediately following description refers to HCCI combustion, but it should be appreciated that this is not necessarily limiting. During a load transient under HCCI combustion, the throttle valve 36 and the supercharger bypass valve 30 may be coordinated to achieve fast response in air charge while minimizing the fuel efficiency loss. In some aspects of the invention, the engine 20 may be configured to respond to a load transient without manipulating the throttle valve 36 at all (which remains wide-open), and the flow of air into the engine 20 is moderated solely by the supercharger bypass valve 30. In other aspects of the invention, the throttle valve 36 and the supercharger bypass valve 30 can act in cooperation.

Another unique aspect is provided by operating the engine 20 with a low lift intake valve setting in at least one SI combustion mode. By setting the intake valve lift to a low setting, the throttle valve 36 can be set more open or even wide-open to reduce throttling losses. Meanwhile, the supercharger SC is able to control the intake pressure or mass air flow by manipulation of the supercharger bypass valve 30, as needed.

Another unique aspect is provided to enable the switch from at least one of the combustion modes into the other (e.g., HCCI and SI) by staging a "pre-switch" or transitional combustion mode. The operational steps carried out to achieve various mode switch transitions are described in detail below.

Depending on the different combustion modes throughout the engine's operating range (one example is illustrated in FIG. 2), the engine management system determines the steady-state set-points for the associated control actuators in order to achieve the best efficiency while maintaining the desired controllability of the target engine.

Figure 3:
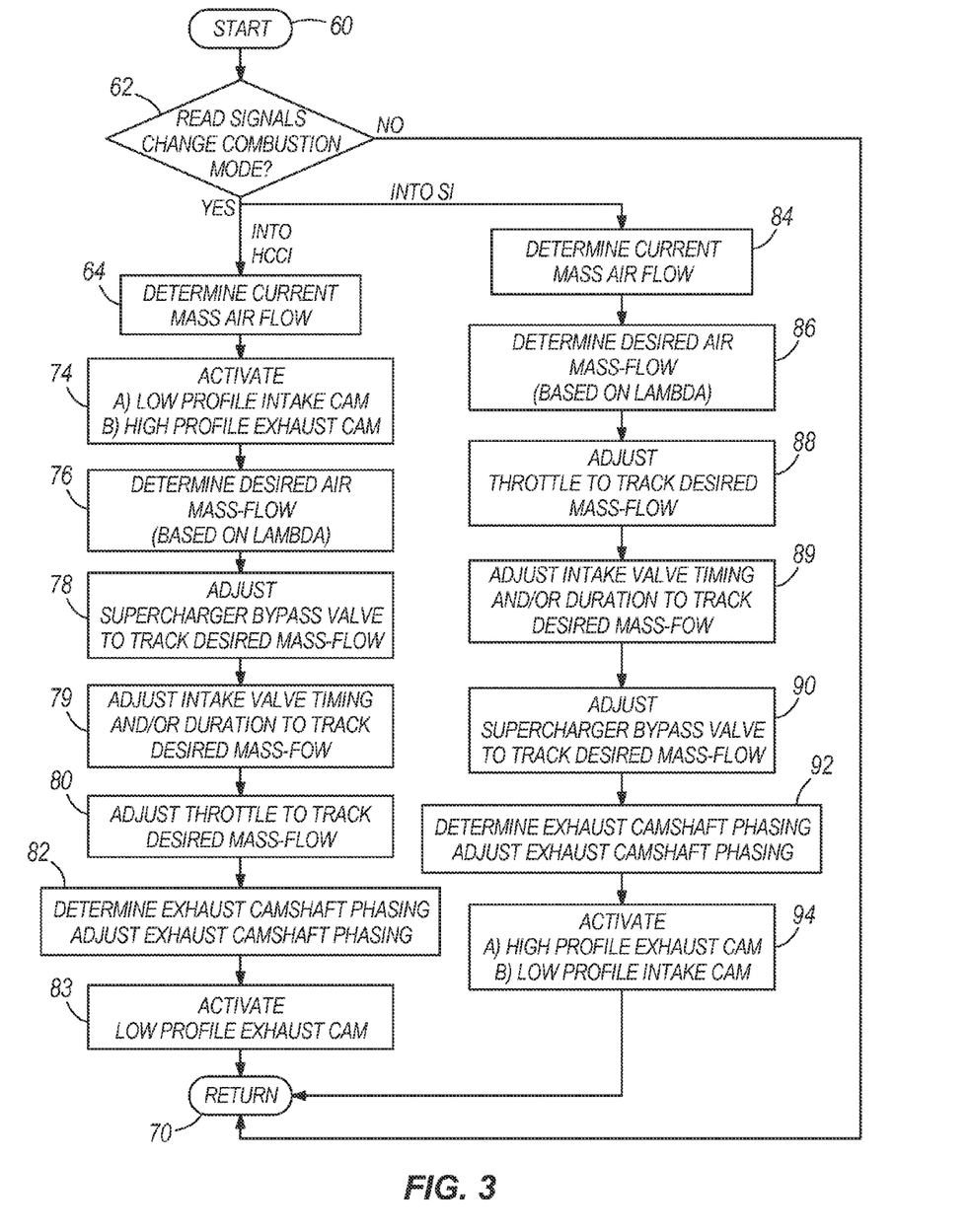
FIG. 3 is a process flow diagram for controlling the internal combustion engine between at least two combustion modes.

As shown in FIG. 3, a control loop runs continuously in an engine control module to manage combustion mode switching of the engine 20. The process begins at step 60. Signals are read at step 62 from which a controller can determine whether a change in combustion modes should be initiated. These signals can be a digital bit signal from the engine control module specifying the current combustion mode, or the pressure rise rate calculated from the in-cylinder pressure sensor signal and the crankshaft position sensor, or intake and exhaust camshaft profiles, or in-cylinder exhaust gas concentration calculated from an online model, or the knock intensity from the knock sensor, or a combination thereof. This decision can be based upon a number of different operating conditions of the engine 20 and/or the vehicle in which the engine 20 is mounted. For example, the engine control module can be configured to monitor for a particular engine or vehicle speed range or rate of change, engine load, coolant temperature, etc. It should be understood that the particular set of operating conditions determining at what points a mode change will occur, and the values or ranges of these operating conditions, can be defined by one of ordinary skill in the art, and at least one aspect of the invention is independent of these factors. If the operating condition(s) indicate that no mode switch is requested, the process goes to step 70, where the loop returns to the start at step 60. However, if the operating condition(s) indicate that a combustion mode switch is requested, the process proceeds to either step 64 or step 84, depending on whether the switching is into HCCI (from SI) or into SI (from HCCI).

When it is determined that the engine 20 should switch into HCCI combustion mode, steps 64, 74, 76, 78, 79, 80, 82, and 83 are carried out. To begin the switch from SI combustion to HCCI combustion, the current mass air flow is determined at step 64. Then, the intake valve lift amount is switched from high-lift to low-lift at step 74. In other words, the intake valve lift amount is reduced. The exhaust lift setting is not changed immediately or with the intake lift setting, and remains until a later step at a high-lift setting present in the SI combustion mode. At step 76, a desired mass air flow amount is determined. This is the mass air flow amount necessary to attain a predetermined excess air factor X for the current operating conditions. Step 76 may be carried out after step 74 or concurrently therewith. At steps 78, 79, and 80, the engine's air path management system is manipulated to achieve the desired mass air flow amount. This can include any one or all of: adjusting the supercharger bypass valve 30 to track desired mass-flow (block 78), adjusting the intake valve timing and/or duration to track desired mass-flow (block 79), and adjusting the throttle valve 36 to track desired mass-flow (block 80). Adjusting either of the supercharger bypass valve 30 or the throttle valve 36 will be understood as adjusting an opening amount thereof. These actions to manipulate the air path management can occur simultaneously or in sequence, but are carried out in a coordinated, predetermined manner with each other to quickly and efficiently achieve the cumulative result of achieving the desired mass air flow. In one aspect of the invention, the throttle valve 36 is opened (e.g., wide-open) and the supercharger bypass valve 30 is adjusted in the closing direction (e.g., from a wide-open state) to a position that causes the supercharger SC to begin generating boost or increase generated boost. This causes an increase in air charge (not matched by correspondingly increased fuel) such that the combustion is leaned. Spark ignition still contributes to initiate combustion for a short time before HCCI combustion is achieved. Although not specifically noted in FIG. 3, the supercharger SC can be engaged (via the clutch 44) if not already engaged when the switch into HCCI combustion mode is requested.

Either during the adjustment of the air path management system, or after the target mass air flow amount is achieved, the phasing of the exhaust valves is adjusted at step 82 to an amount determined to begin trapping residual exhaust gases, or increase the amount of residual exhaust gases trapped after a combustion event. After one or more engine cycles occur after adjusting the exhaust valve phasing, the exhaust valve lift setting is reduced at step 83 (e.g., by switching from a high lift cam to a low lift cam). After one or more engine cycles, the engine 20 will cease spark ignition and begin operating in HCCI mode (i.e., sparking may still occur, but is not used to ignite combustion). The pre-staging of the actuators, including the supercharger bypass valve 30, in the above-described sequence enables the engine 20 to transition in a predictable, controllable manner which is smooth and less apparent to the vehicle operator. Once operating in HCCI mode, the control loop reaches step 70, and returns to the start at step 60. The engine 20 will continue operating in HCCI mode until a mode switch is requested (at step 62) back to SI combustion.

When the engine 20 is operating in HCCI mode and a mode switch to SI combustion is requested, steps 84, 86, 88, 89, 90, 92, and 94 are carried out. To begin the switch from HCCI combustion to SI combustion, the current mass air flow is determined at step 84. At step 86, a desired mass air flow amount is determined. This is the mass air flow amount necessary to attain a predetermined excess air factor X for the current operating conditions. At steps 88, 98, and 90, the engine's air path management system is manipulated to track the desired mass air flow amount. This can include the adjustment of the throttle valve 36 (block 88), the adjustment of at least one of the intake valve timing and duration (block 89), and the adjustment of the supercharger bypass valve 30 (block 90) to achieve the desired mass air flow amount determined at step 86. Any or all of these actions can occur simultaneously or in sequence. In one aspect of the invention, the throttle valve 36 is initially left wide-open (as in HCCI mode), and the supercharger bypass valve 30 is adjusted in the opening direction, reducing charge dilution generated by supercharger boost. This causes a decrease in air charge (for a corresponding amount of fuel) such that the combustion is enriched. The engine 20 may still combust fuel and air without spark ignition for a short time before SI combustion begins. In one aspect of the invention, the adjustment of the throttle valve 36 at step 88 and the adjustment of the supercharger bypass valve 30 at step 90 are coordinated together in a predetermined manner and may occur simultaneously to quickly and efficiently achieve the target mass air flow amount, while any adjustment to the intake valve timing and/or duration is delayed until after block 92, discussed below. Although not specifically noted in FIG. 3, the supercharger SC can also be disengaged (via the clutch 44) during the switch into SI combustion mode.

Either during the adjustment of the throttle valve 36 and the supercharger bypass valve 30, or after the target mass air flow amount is achieved, the phasing of the exhaust valves is adjusted at step 92 to an amount determined to stop trapping residual exhaust gases, or reduce the amount of residual exhaust gases trapped after a combustion event. Then, the exhaust valve lift amount is switched from low lift to high lift at step 94. In other words, the exhaust valve lift amount is increased. Although the intake valve lift may later be changed from low lift to high lift in SI combustion mode, the intake valve lift is initially left at the low lift setting in one aspect of the invention. In another aspect of the invention, the intake valve lift is switched from the low lift setting to the high lift setting (in other words, the intake valve lift amount is increased) at step 94. Within a predetermined number of engine cycles after adjusting the exhaust valve phasing, and subsequently the exhaust (and in some cases intake) lift amounts, spark ignition will commence and the engine 20 will cease auto-ignition and begin operating in SI mode. If the supercharger SC was not previously disengaged via the clutch 44 during the mode switch, the supercharger SC may then be disengaged. Regardless of whether the supercharger SC is mechanically disengaged or simply bypassed via the open bypass valve 30, the throttle valve 36 will resume normal operation to throttle the flow of air into the engine 20 during SI combustion mode. The pre-staging of the actuators, including the supercharger bypass valve 30, in the above-described sequence enables the engine 20 to transition in a predictable, controllable manner which is smooth and less apparent to the vehicle operator. Once operating in SI mode, the control loop reaches step 70, and returns to the start at step 60. The engine 20 will continue operating in SI mode until a mode switch is requested (at step 62) back to HCCI combustion.

Thus, according to at least one aspect of the invention, a transition from HCCI combustion to SI combustion or vice versa can be carried out in a process that provides adequate control of the combustion events to enable predictable, stable combustion throughout a mode change.

Furthermore, it should be noted that transitioning between SI and HCCI can include transitioning between stoichiometric SI and lean HCCI through a transition mode, which can be a lean SI mode or a stoichiometric HCCI mode. The engine 20 may be capable of transitioning through either type of transition mode, and the desired transition mode may be selected from lean SI and stoichiometric HCCI at step 76 (if transitioning into HCCI) or step 86 (if transitioning into SI). The type of transition mode can be selected based upon the desired mass air flow amount. In other words, a target mass air flow amount (from step 76 or step 86) in a first range may dictate that the engine transition through a lean SI mode, and a target mass air flow amount (from step 76 or step 86) in a second range may dictate that the engine transition through a stoichiometric HCCI mode.

The invention claimed is:

1. A method for switching from a current combustion mode, which is either of a low-dilution combustion mode and a high-dilution combustion mode, to a target combustion mode, which is the other of the low-dilution and high-dilution combustion modes in an internal combustion engine having an intake passage with an exhaust-driven turbocharger, a crankshaft-driven positive displacement supercharger downstream of the turbocharger and having variable boost output controllable with a supercharger bypass valve, and a throttle valve downstream of the supercharger, the method comprising:
   determining the current combustion mode;
   determining current mass air flow;
   commanding a combustion mode switch to the target combustion mode when a current operating condition falls within a range of predetermined operating conditions;
   determining a target mass air flow amount to achieve a target air-fuel ratio corresponding to the current operating condition and the target combustion mode;
   controlling a degree of opening of both the supercharger bypass valve and the throttle valve to achieve the target mass air flow; and
   manipulating an amount of residual exhaust gas.

2. The method of claim 1, wherein the current combustion mode is stoichiometric spark ignition (SI) and the target combustion mode is the high-dilution combustion mode of homogeneous charge compression ignition (HCCI) combustion, and wherein manipulating the amount of residual exhaust gas is carried out by adjusting an exhaust valve phasing, the method further comprising transitioning through a lean SI transition mode by reaching the target mass air flow prior to adjusting the exhaust valve phasing, and the switch into HCCI is completed by reducing the exhaust lift amount to stage the necessary in-cylinder conditions for auto-ignition within a predetermined number of engine cycles.

3. The method of claim 1, wherein manipulating the amount of residual exhaust gas includes adjusting phasing of an exhaust valve actuation.

4. The method of claim 3, wherein the spark ignition device is prevented from initiating combustion within a predetermined number of engine cycles after the phasing of the exhaust valve actuation is adjusted.

5. The method of claim 1, wherein controlling the degree of opening of both the supercharger bypass valve and the throttle valve to achieve the target mass air flow includes controlling the throttle valve to move to or remain at a wide open position.

6. The method of claim 1, wherein the high-dilution combustion mode is homogeneous charge compression ignition (HCCI) combustion in which a spark ignition device of the engine does not initiate combustion, and wherein switching between the current combustion mode and the target combustion mode includes transitioning through a transition combustion mode.

7. The method of claim 6, wherein the transition combustion mode includes one of a lean spark ignition (SI) combustion mode and a stoichiometric HCCI combustion mode.

8. The method of claim 7, further comprising selecting one of the lean SI combustion mode and the stoichiometric HCCI mode based on the determination of the target mass air flow amount.

9. The method of claim 6, wherein the transition combustion mode is spark-assisted compression ignition (SACI).

10. The method of claim 1, wherein the high-dilution combustion mode is spark-assisted compression ignition (SACI).

11. The method of claim 1, further comprising adjusting at least one of intake valve timing and duration in conjunction with controlling the degree of opening of both the supercharger bypass valve and the throttle valve to achieve the target mass air flow.

12. A method for switching from low-dilution combustion mode to a high-dilution combustion mode, in an internal combustion engine having an intake passage with an exhaust-driven turbocharger, a crankshaft-driven positive displacement supercharger downstream of the turbocharger and having variable boost output controllable with a supercharger bypass valve, and a throttle valve downstream of the supercharger, the method comprising:
   switching from a high lift intake valve setting to a low lift intake valve setting;
   determining a target mass air flow amount to achieve a target air-fuel ratio for the high-dilution combustion mode under a current operating condition;

controlling a degree of opening of both the supercharger bypass valve and the throttle valve to achieve the target mass air flow after switching to the low lift intake valve setting to achieve a transitional combustion mode;

operating in the transitional combustion mode while adjusting phasing of an exhaust valve actuation to increase residual exhaust gas;

switching from a high lift exhaust valve setting to a low lift exhaust valve setting after the phasing of the exhaust valve actuation is adjusted; and commencing auto-ignition within a predetermined number of engine cycles after switching to the low lift exhaust valve setting.

13. The method of claim 12, wherein controlling the degree of opening of both the supercharger bypass valve and the throttle valve to achieve the target mass air flow includes controlling the throttle valve to move to a wide open position.

14. The method of claim 12, wherein the low-dilution combustion mode is stoichiometric spark ignition (SI), and the high-dilution combustion mode is homogeneous charge compression ignition (HCCI).

15. The method of claim 12, wherein the transitional combustion mode includes one of a lean spark ignition (SI) combustion mode and a stoichiometric homogeneous charge compression ignition (HCCI) combustion mode.

16. The method of claim 15, further comprising selecting one of the lean SI combustion mode and the stoichiometric HCCI mode based on the determination of the target mass air flow amount.

17. The method of claim 12, wherein the transitional combustion mode is spark-assisted compression ignition (SACI).

18. The method of claim 12, further comprising manipulating an amount of residual exhaust gas.

19. The method of claim 12, further comprising adjusting at least one of intake valve timing and duration in conjunction with controlling the degree of opening of both the supercharger bypass valve and the throttle valve to achieve the target mass air flow.

* * * * *